2,895,983

BETA HYDROXY PHOSPHINOTHIOIC ESTERS AND METHOD OF PREPARING SAME

Peter A. Asseff, Cleveland, Ohio, assignor to The Lubrizol Corporation, Wickcliffe, Ohio, a corporation of Ohio No Drawing. Application April 30, 1956
Serial No. 581,280

4 Claims. (Cl. 260—461)

This invention relates to the chemistry of organophosphorus compounds and more particularly to the chemistry of organic phosphorus thioic acids which contain a carbon to phosphorus linkage. In a still more particular consideration it relates to a process for the preparation of certain esters of such acids.

The products available as a result of this invention are useful in the formulation of various industrial products such as, for example, motor oils, gear lubricants, metal finishing composition, ore flotation agents, etc. In such formulations the products of this invention serve largely to impart the properties of an extreme pressure agent. Gear lubricants, for example, which are subjected to such conditions of extreme pressure are very much improved by the addition of the products of this invention so that they may better withstand the extreme pressures of the environments in which they are used. Likewise, when used in metal finishing compositions, these products act to provide an enhanced degree of protection from the ravages of extreme pressure. In addition to the desirability of these products in view of their extreme pressure properties, they are particularly useful because of their compatibility with other known additives which are useful in these formulations. Other useful properties of the products of this invention include their ability to inhibit oxidation and corrosion which properties account for their utility as ore flotation agents, etc.

It is a principal object of the invention to provide a process for the preparation of certain phosphorus- and sulfur-containing compositions.

It is also an object of the present invention to provide new compositions of matter.

These and other objects are accomplished by the process of this invention, said process comprising the reaction of a phosphorus thioic acid having a carbon to phosphorus linkage, with an organic epoxide. The process may be defined more narrowly as comprising the reaction of (a) a phosphorus thioic acid having the structure

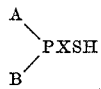

where A is a non-functional organic radical attached directly to the phosphorus atom through a carbon atom, B is selected from the class consisting of RO, RS, R and H, where R is a non-functional organic radical and X is selected from the class consisting of oxygen and sulfur, with (b) an organic compound selected from the class consisting of epoxides and thioepoxides.

The product available from the above process is a beta-hydroxy (or mercapto) alkyl ester and represents a novel class of organic compounds.

The non-functional radicals R and R' may be aliphatic or aromatic and may contain organic or inorganic substituents.

The term "non-functional" is used to indicate that the radicals do not take part in or have any significant influence upon the reaction of the process. Illustrative types of organic radicals include alkyl, cycloalkyl, aryl, aralkyl, alkaryl, alkenyl, cycloalkenyl, etc., and the substituted derivatives of these, e.g., nitro-, halo-, alkoxy-, hydroxy-, carboxy-, etc.

It will be noted that the above structural formula can accommodate phosphorus thioic acids in which there are one, two or three sulfur atoms. Of these the phosphorus dithioic acids represent a preferred class of starting materials. It should also be noted that the above structural formula is applicable to phosphinothioic acids and phosphonothioic acids. Phosphinothioic acids contain two carbon-to-phosphorus

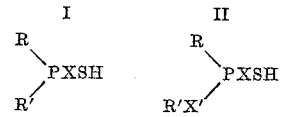

linkages as illustrated in I whereas phosphonothioic acids, illustrated in II, contain but one carbon-to-phosphorus linkage. In each of these structural formulas X may be either oxygen or sulfur. While both of these types of acids are within the contemplated scope of the invention the phosphinothioic acids are preferred as starting materials. Particularly preferred, because of their availability and convenience and ease of reaction are the phosphinodithioic acids.

The phosphinodithioic acids may be prepared most conveniently by the process described in copending application, Serial No. 406,323, filed January 26, 1954. This process comprises the reaction of an aromatic compound with phosphorus pentasulfide in the presence of an aluminum halide. Other means of preparing phosphinodithioic acids involve either the reaction of a Grignard reagent with phosphorus pentasulfide or sulfurization of a secondary phosphine.

The organic epoxides and thioepoxides may be represented as having the structural grouping

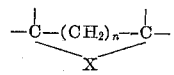

where X is oxygen or sulfur and $n$ is 0 or 1. Those epoxides and thioepoxides are preferred in which one of the carbon atoms attached to X is attached also to two hydrogen atoms. In other words, the preferred compounds are terminal epoxides and thioepoxides and have the structural grouping.

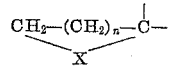

where X and $n$ are as defined above. These have been given the name "terminal" epoxides and thioepoxides because they may be thought of in most cases as being derived from a vinyl compound or one which has a terminal olefinic double bond.

Specific examples of suitable epoxides include ethylene oxide, propylene oxide, epichlorohydrin, 1-butene oxide, butadiene monoxide, 1-amylene oxide, styrene oxide, trimethylene oxide, 9,10-epoxystearic acid, epoxidized soybean oil, propylene sulfide, etc.

As noted previously, the process of the invention contemplates the use either of epoxides and thioepoxides. As a matter of convenience, the term epoxide is used hereinafter in a broad sense to indicate both the epoxides and thioepoxides.

The reaction of the phosphorus thioic acid with an organic epoxide is in many cases exothermic and although it is not necessary, it is desirable to control the temperature of the reaction mixture so that it is reasonably constant throughout the course of the reaction.

The products which are available from the process of this invention are substituted and unsubstituted beta- or gamma-hydroxy (or mercapto) esters represented by the structural formula

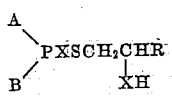

where A, B and X are as previously defined and R is hydrogen or organic radical, the identity of which corresponds to the organic residue of the epoxide which is used in the process.

Examples of such products which may be prepared by the hereindescribed process include beta-hydroxyethyl diphenyl phosphinodithioate, beta-hydroxypropyl di-(p-chlorophenyl) phosphinodithioate, beta-hydroxy beta-phenethyl dibutyl phosphinodithioate, beta-hydroxybutyl di-(amylphenyl) phosphinodithioate, gamma-hydroxypropyl diphenyl phosphinomonothioate, beta-hydroxyethyl diethylphosphinodithioate, beta-hydroxy gamma-carboxy-propyl diphenyl phosphinodithioate, beta-hydroxyamyl diphenyl phosphinodithioate, etc.

The process of the invention is illustrated in further detail by the following specific examples:

Example 1

To 704 grams (2.0 moles) of di-(chlorophenyl) phosphinodithioic acid there was added dropwise with stirring 125.6 grams (2.2 moles) of propylene oxide. The addition required 2¼ hours and the temperature was maintained at about 60° C. by the rate of addition of propylene oxide. The resulting product was concentrated by heating to a final temperature of 70° C./30 mm. and the residue, substantially pure beta-hydroxypropyl di(chlorophenyl) phosphinodithioate, showed the following analysis:

| | Percent |
|---|---|
| S | 15.3 |
| P | 7.7 |

Example 2

To 337 grams (0.72 equivalent) of di-(p-chlorophenyl) phosphinodithioic acid there was added 90 grams (0.84 equivalent) of octylene epoxide. The resulting reaction was exothermic causing the temperature to rise from 30° C. to 103° C. The reaction mixture was stirred for an additional hour at 100–110° C. at which point an additional 15 grams of octylene epoxide was added and stirring at this same temperature resumed for another two hours. The mixture was filtered through Hyflo to yield a brown liquid product, substantially pure beta-hydroxyoctyl di-(p-chlorophenyl) phosphinodithioate. Its analysis was as follows:

| | Percent |
|---|---|
| P | 7.4 |
| S | 13.8 |
| Cl | 16.5 |

Example 3

A mixture of 935 grams (3.4 equivalents) of diphenyl phosphinodithioic acid and 396 grams (6.8 equivalents) of propylene oxide was heated at reflux temperature (50–60° C.) for 90 minutes. The resulting mixture was freed of unreacted propylene oxide by distillation and then filtered. The filtrate substantially pure beta-hydroxypropyl diphenyl phosphinodithioate, showed the following analysis:

| | Percent |
|---|---|
| P | 10.3 |
| S | 20.3 |

Example 4

To 423 grams (1.0 equivalent) of ditolyl phosphinodithioic acid there was added 95 grams (1.5 equivalents) of propylene oxide. This mixture was heated for two hours at 90–100° C., then concentrated and filtered. The filtrate, substantially pure beta-hydroxpropyl ditolyl phosphinodithioate, showed the following analysis:

| | Percent |
|---|---|
| P | 8.1 |
| S | 13.7 |

Example 5

An alkylphenyl phosphinodithioic acid was prepared by the alkylation of benzene with chlorinated kerosene and subsequent reaction of this product with phosphorus penta sulfide in the presence of aluminum chloride. A 485-gram sample (0.9 equivalent) of this phosphinodithioic acid was mixed with 108 grams (1.9 equivalents) of propylene oxide and heated for nine hours at 60–70° C. The unreacted propylene oxide was removed by distillation to yield a liquid residue having the following analysis:

| | Percent |
|---|---|
| P | 4.6 |
| S | 8.7 |

Other modes of applying the principle of the invention may be employed, change being made as regards the details described, provided the features stated in any of the following claims, or the equivalent of such, be employed.

I therefore particularly point out and distinctly claim as my invention:

1. The process of preparing neutral phosphorus- and sulfur-containing compounds which comprises the reaction of (a) a phosphinodithioic acid having the structural formula

where A and B are alkylphenyl groups, with (b) propylene oxide.

2. The process of preparing neutral phosphorus- and sulfur-containing compounds which comprises the reaction of (a) a phosphinodithioic acid having the structural formula

where A and B are selected from the class consisting of phenyl, chlorophenyl and alkylphenyl radicals with (b) a compound selected from the class consisting of lower aliphatic epoxides, epoxidized aliphatic esters and styrene oxide.

3. The process of preparing neutral phosphorus- and sulfur-containing compounds which comprises the reaction of (a) a phosphinodithioic acid having the structural formula

where A and B are selected from the class consisting of phenyl, chlorophenyl and alkylphenyl radicals with (b) a lower alkylene oxide.

4. The process of claim 3 characterized further in that the lower alkylene oxide of (b) is propylene oxide.

References Cited in the file of this patent

UNITED STATES PATENTS 2,587,340     Lewis et al.     Feb. 26, 1952